(12) United States Patent  
Rannow et al.

(10) Patent No.: US 7,738,681 B1  
(45) Date of Patent: Jun. 15, 2010

(54) FINGERPRINT AND PHYSICAL ATTRIBUTE DETECTION

(75) Inventors: Randy K. Rannow, Albany, OR (US); Alexandre M. Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1261 days.

(21) Appl. No.: 11/264,202

(22) Filed: Nov. 1, 2005

(51) Int. Cl.
*G06K 9/00* (2006.01)

(52) U.S. Cl. ..................................... 382/124

(58) Field of Classification Search ......... 382/115–126; 340/5.8, 5.81, 5.82, 5.83; 713/186; 902/3
See application file for complete search history.

(56) References Cited

U.S. PATENT DOCUMENTS

| | | | |
|---|---|---|---|
| 5,719,950 A * | 2/1998 | Osten et al. ................ 382/115 |
| 6,114,862 A | 9/2000 | Tartagni et al. | |
| 6,501,284 B1 | 12/2002 | Gozzini | |
| 6,512,381 B2 | 1/2003 | Kramer | |
| 6,628,812 B1 * | 9/2003 | Setlak et al. ............... 382/124 |
| 6,636,053 B1 | 10/2003 | Gozzini | |
| 6,665,428 B1 | 12/2003 | Gozzini | |
| 7,366,331 B2 * | 4/2008 | Higuchi ..................... 382/124 |
| 7,400,750 B2 * | 7/2008 | Nam .......................... 382/124 |
| 2006/0056663 A1 * | 3/2006 | Call .......................... 382/115 |
| 2006/0248341 A1 * | 11/2006 | Lambert et al. ........... 713/182 |

OTHER PUBLICATIONS

Agilent Technologies, "Time Domain Reflectometry Theory", Application Note 1034-2, Aug. 2002.
Caltron Industries, Inc., http://www.caltronind.com/touch_screen_signage_options/touchscreen_technologies.html, downloaded Sep. 26, 2005.
Sensors Magazine, http://www.sensorsmag.com/articles/1000/68/main.shtml, downloaded Sep. 26, 2005.
Time Domain Reflectometry, http://www.thom-tech.com/tdr.htm, download Oct. 24, 2005.

* cited by examiner

Primary Examiner—Daniel G Mariam (57) ABSTRACT

A first type of measurement and a second type of measurement are performed to determine a fingerprint of an object. A physical attribute of the object is also determined.

29 Claims, 8 Drawing Sheets

FIG. 5

FINGERPRINT AND PHYSICAL ATTRIBUTE DETECTION

TECHNICAL FIELD

The technical field relates to fingerprint and physical attribute detection for an object.

BACKGROUND

User identification devices have become increasingly popular for decreasing security threats, increasing safeguard techniques, and to help prevent fraud. Typically, a user identification device is used to gain access to a location or a system or may be used simply for identification, such as gaining access to your personal electronic device. One type of conventional user identification device is a biometric sensor in fingerprinting. Fingerprints have been widely accepted as unique identifiers for individuals. That is no two people have been known to have the exact fingerprint. Conventional fingerprint sensors typically require a user to place a finger or hand on the sensor. The fingerprint is detected by the sensor, and compared to a catalogued fingerprint for the user.

One type of conventional fingerprint sensor is a capacitive fingerprint sensor. A fingerprint is comprised of ridges and valleys. When a finger is placed on the sensor a capacitance is measured. The measured capacitance varies per user because each user has different ridges and valleys on their respective fingers.

Capacitive fingerprint sensors are popular but may be inaccurate due to the inability to make fine-grain measurements. For example, a conventional capacitive sensor may comprise two conductive plates and a dielectric formed there between. The capacitance changes as a result of placing a finger on one of the conductive plates. These sensors may be inaccurate due to noise. The change in capacitance sensed by the sensors when measuring a fingerprint should be much larger than a nonsystematic error in measurement, which may be caused by changes in contact between the device and the finger, or much larger than any errors in measurement that may result from natural or seasonal drift, such as drift resulting from seasonal, environmental changes or ageing Some conventional sensors are not capable of taking fine grain-measurements for different sections of a fingerprint and thus may result in two people having indistinguishable capacitive measurements.

Furthermore, conventional fingerprint sensors are subject to spoofing. For example, a gel formed as an authorized person's fingerprint or a finger removed from a deceased person may be used by an unauthorized user to trick a fingerprint sensor and gain access to a location or a system, because conventional fingerprint sensors typically do not determine a physical attribute of the object with the fingerprint, such as whether the physical attribute is such as living or dead human tissue.

SUMMARY

According to an embodiment, a first type of measurement and a second type of measurement are performed to determine a fingerprint of an object. A physical attribute of the object is also determined.

BRIEF DESCRIPTION OF THE DRAWINGS

Various features of the embodiments can be more fully appreciated, as the same become better understood with reference to the following detailed description of the embodiments when considered in connection with the accompanying figures.

DETAILED DESCRIPTION

For simplicity and illustrative purposes, the principles of the embodiments are described. Moreover, in the following detailed description, references are made to the accompanying figures, which illustrate specific embodiments. Changes may be made to the embodiments without departing from the spirit and scope of the embodiments.

According to an embodiment, a sensing device is operable to determine a fingerprint of an object placed on the sensing device. A fingerprint is a sensed landscape of an object placed on the sensing device. The object may include a finger, toe, forehead or another portion of a person's body or other non-human items. In one example, the landscape is characterized by a unique pattern of ridges and valleys which is sensed by the sensing device.

According to an embodiment, multiple types of measurements may be performed for each fingerprint. For example, two types of measurements, such as capacitive measurements, resistive measurements, piezoelectric, and/or photo measurements, which may include measurements taken by charged-coupled devices (CCDs), are used to determine a fingerprint. Another type of measurement is performed to determine a physical attribute of an object placed on the sensing device. For example, a measurement is performed to determine whether the object has a characteristic of living human tissue. Other types of physical attributes may also be detected. More than one type of measurement may be performed to determine the physical attribute, such as infrared (IR) measurements or surface wave measurements. Use of multiple types of measurements methods minimizes the probability of spoofing the sensing device. Also, the sensing device may be modular to allow for adding or removing sensors, which may be operable to perform different types of measurements.

Figure 1:
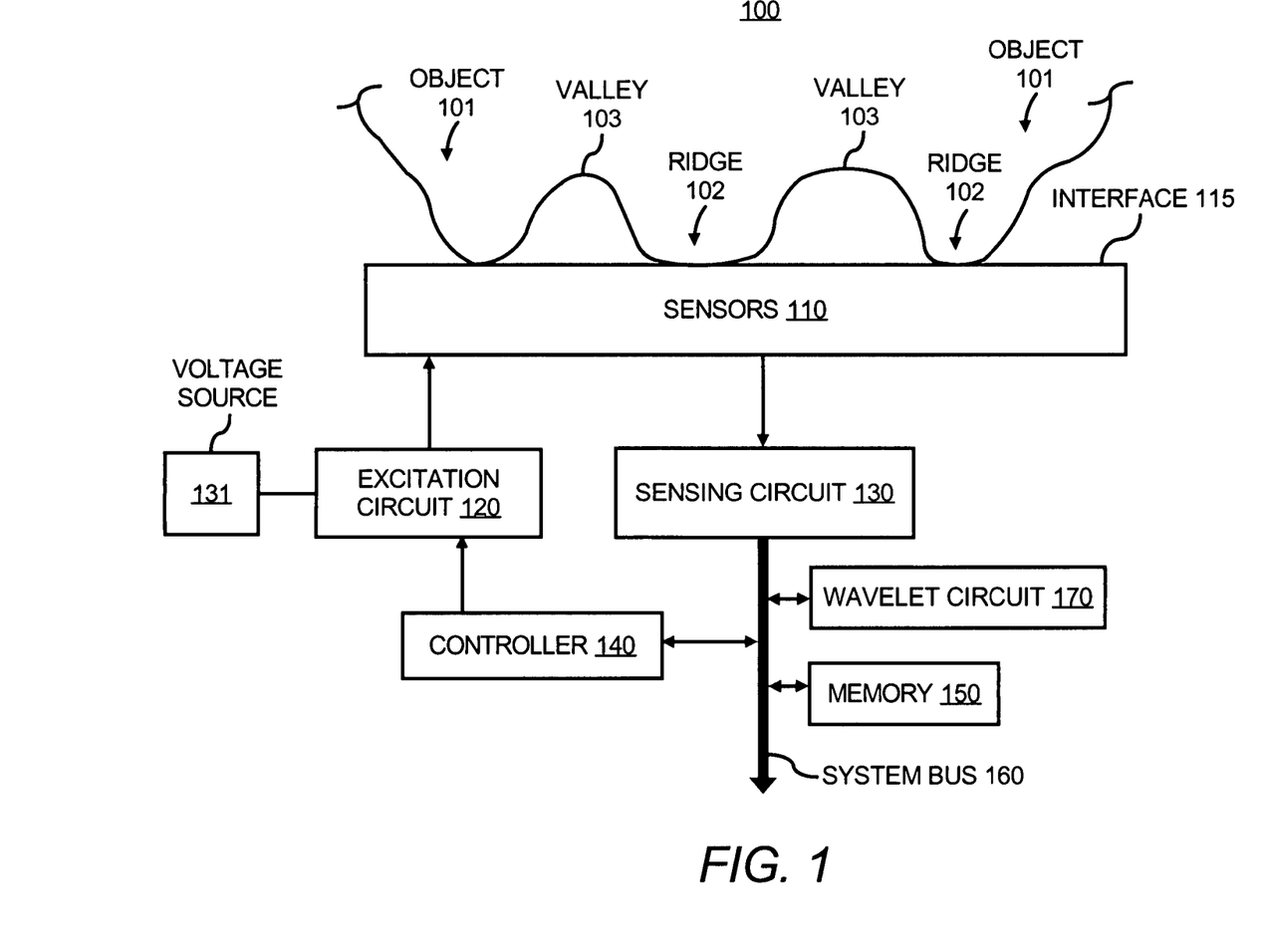
FIG. 1 illustrates a block diagram of a sensing device, according to an embodiment.

FIG. 1 illustrates a block diagram of a sensing device 100 according to an embodiment. The sensing device 100 includes sensors 110, an excitation circuit 120, a sensing circuit 130 receiving the output of the sensors 110, and a controller 140.

The sensors 110 may be capacitive sensors, photo-sensors, resistive sensors, piezoelectric sensors, IR sensors, surface wave sensors or other types of known sensors. The sensors 110 may include a combination of multiple types of sensors.

For example, at least some of the sensors 110 may be operable to perform multiple types of measurements, such as capacitive, resistive, photo, or piezoelectric-type measurements, or different sensors are operable to perform different types of measurements.

Figure 2A:
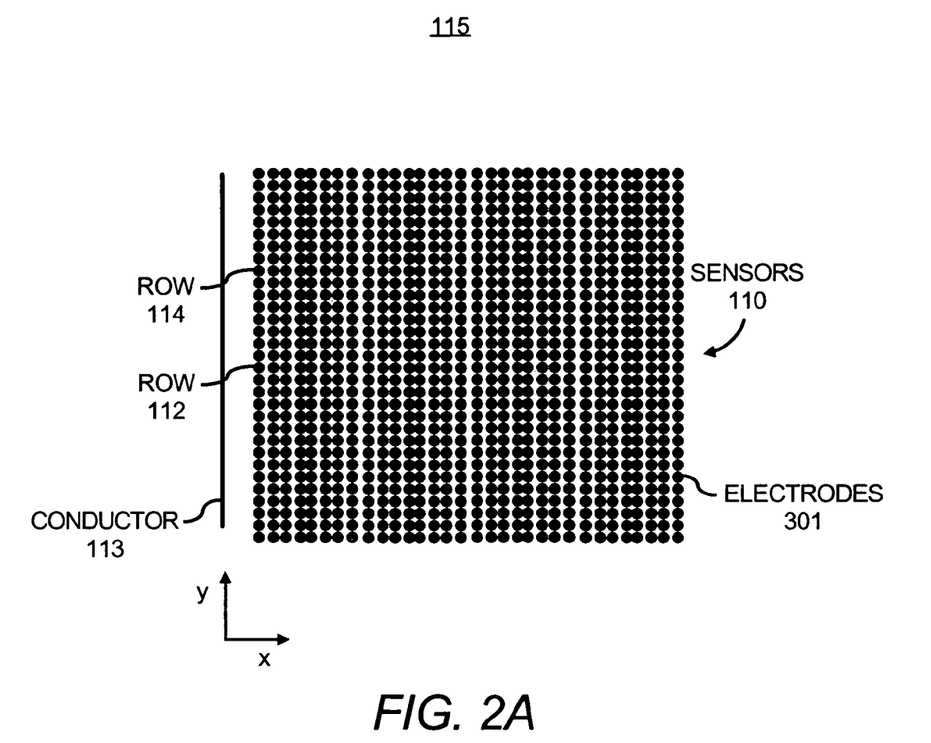
FIG. 2A illustrates a top view of an array of sensors, including individual electrodes, that may be used in the sensing device, according to an embodiment.

According to an embodiment, the sensors 110 are used to determine a fingerprint and a physical attribute of an object placed on the sensors 110. In one embodiment, the sensors 110 comprise an array of sensors, and the excitation circuit 120 includes addressing circuitry, as is known in the art, for selectively addressing one or more of the sensors and applying a voltage to the addressed sensors to perform measurements. The excitation circuit 120 may be connected to a voltage source 131 for selectively applying a voltage to various electrodes of the sensors 110 as determine by the controller 140 to measure changes at an interface 115 for the sensing device 100 detected by the sensors 110, such as a change in capacitance, a change in resistivity, or a change in another type of measurement. An example of the interface 115 is shown in FIG. 2A. The changes may be caused by the landscape of the object 101. As shown in FIG. 1, the object 101 has ridges 102 and valleys 103 that form the landscape.

A memory 150 may store fingerprints and lookup tables for determining fingerprints and physical attributes. A system bus 160 may be used for data communication within the sensing device 100. It will be apparent that other configurations of the sensing device 100 may be used, and that the sensing device 100 may include other known components not shown. For example, the controller 140 is operable to compare a detected fingerprint and physical attribute with a stored fingerprint and physical attribute to determine whether a user is an authorized user. The controller 140 may be connected to another device or actuator that is not shown, which is activated in response to determining a user is authorized.

1. Sensors for Determining Fingerprint

The sensing circuit 130 receives the output of the sensors 110 and may transmit the output to the memory 150 and the controller 140 via the system bus 160. In one example, the sensors 110 are capacitive sensors that each output a voltage. The voltage changes as the capacitance varies. For example, the object 101 is placed on the sensors 110. The ridges 102 and the valleys 103 are exaggerated in FIG. 1. The voltage output of a sensor varies depending on whether the sensor is closer to a ridge or a valley. The sensing circuit 130 may convert the voltage output of each sensor to a digital value. These values are used by the controller 140 to determine the fingerprint of the object 101. The sensors 110 may comprise other types of sensors, such as resistive, piezoelectric, infrared, and/or photo-sensors for determining the fingerprint. The voltage output of these types of sensors may also be used by the controller 140 to determine the fingerprint.

Figure 2B:
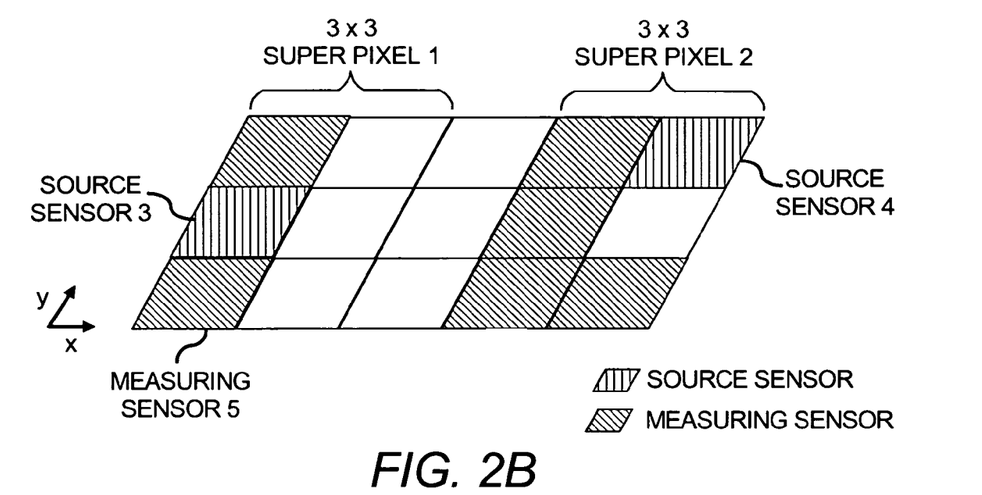
FIG. 2B illustrates superpixels in the array of sensors, according to an embodiment.
Figure 2C:
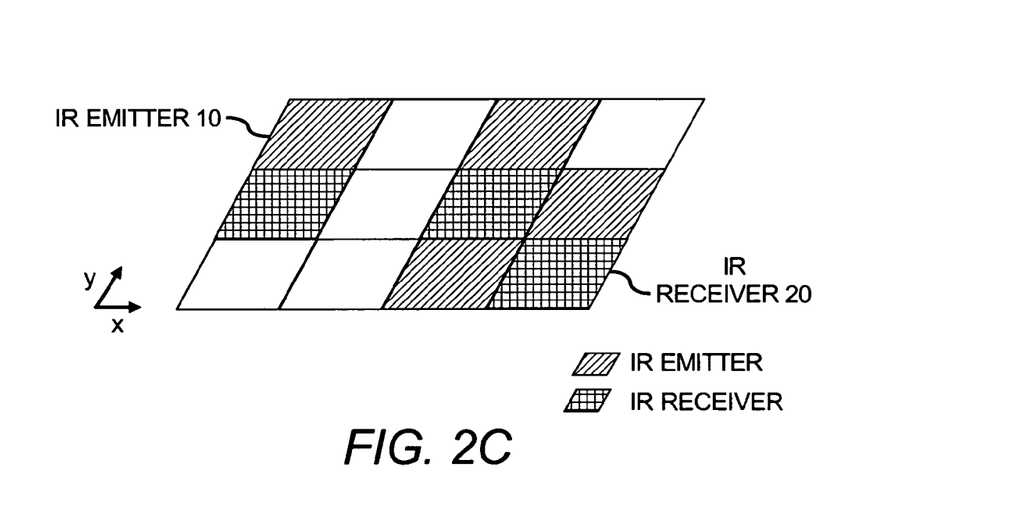
FIG. 2C illustrates infrared sensors in the array of sensors, according to an embodiment.

According to an embodiment, the sensors 110 are operable to take local measurements and create a map of local measurements which represent the fingerprint. For example, the sensors 110 are arranged as a grid (x,y) of sensors. Examples of the sensors 110 arranged as a grid are shown in FIGS. 2A-C. Measurements are performed at many of the (x,y) coordinates of the grid. All the sensors 110 may take measurements or a subset of the sensors may take measurements for determining the fingerprint and a physical attribute of the object 101. In one embodiment, a subset of the sensors 110 performs measurements at certain areas of the fingerprint, which may be predetermined or random, for determining the fingerprint. The controller 140 shown in FIG. 1 may select the sensors to perform the measurements. Collectively, the measurements for a fingerprint are stored as a map of measurements. This may include measurements at different (x,y) coordinates if the sensors are represented as a 2-dimensional (x,y) grid. A wavelet circuit 170 may be used to convert measurements into wavelets. Wavelets are known in the art and may include a compressed and de-noised form of data. Using wavelets allows a large number of maps to be stored in the memory 150. The wavelet circuit 170 may generate wavelets for many types of measurements, such as capacitive measurements, resistive measurements, piezoelectric, photo measurements, IR, or other types of measurements. Wavelets may be formed from a delta of the capacitances without the object 101 and measured capacitances with the object 101.

The controller 140 is operable to select sensors of the sensors 110 for measuring a fingerprint. In one embodiment, the controller 140 randomly selects the sensors to be used to measure a fingerprint for each user or for a group of users. For example, user A places a finger on the sensing device 100. The controller 140 randomly selects sensors from the sensors 110 to perform a first type of measurement for determining the fingerprint. An identification of the sensors used to measure the fingerprint of user A is stored in the memory 150, and these sensors may be used to repeat the measurement when user A returns. In another embodiment, sensors are selected for taking measurements based on an estimation of the locations of the greatest number of valleys and ridges in a fingerprint. For example, adult fingerprints are determined to generally have the greatest density of valleys and ridges in the center of the fingerprint. Thus, the controller 140 selects a larger number of sensors in the center of an interface of the sensing device 100 to measure the fingerprint.

2. Determining Physical Attribute

The controller 140 may also use the sensor output to determine a physical attribute of the object 101, such as whether the object 101 comprises living human tissue or not. In one embodiment, a surface wave is generated between the object and the sensors 110.

As described above, the sensors 110 may comprise a sensor grid in two dimensions, such as (x,y). For example, some of the sensors 110 may form a capacitive-inductive grid. Surface waves may be generated in the sensor grid using some of the sensors as excitation surfaces or using a separate conductor.

The sensor grid is homogeneous when a finger or other object is not placed on the sensors 110. For example, the capacitance of the grid, $C(x,y)$, is a constant value, and the inductance of the grid, $L(x,y)$, is a constant value. The constant value may be a small range of values.

The grid is homogeneous without a finger, $C(x,y)=const$, $L(x,y)=const$. After the finger is pressed against the sensor grid, this is not true anymore, and C and L would vary with the position of the element on the grid. As a result, the passband shrinks and shifts. Both shrinking and shift can be stored in a lookup table for a comparison When a finger is pressed against the sensors 110, C and L varies based on the position of the finger on the sensor grid comprised of the sensors 110. Some of the sensors measure the surface waves and the measurements are converted to wavelets by the wavelet circuit 170. Placing a finger on the sensors 110 changes the transmission characteristics of the surface waves, because the surface waves are now traveling through different mediums. For example, the surface wave travels through different mediums, such as the object, air and an insulator layer of the sensors 110. This results in the passbands of the wavelets for the sensed surface waves to drift, such as shrinking and shifting of a passband for the wavelets. The drift of the wavelets may be compared to values in a lookup table in the memory 150 to determine whether the physical attribute is an attribute of living skin tissue.

In one embodiment, the surface waves are generated by applying a current to the object 101 through some of the electrodes of the sensor 110. The controller 140 may randomly select a sensor or group of sensors to generate the surface wave. In one embodiment, the sensors 110 comprise an array of electrodes or pixels of the sensors 110. The array of sensors are comprised of superpixels. Each superpixel is a subarray of sensors. For example, a subarray comprises a 3×3 array of sensors. The controller 140 randomly selects a sensor in each of multiple superpixels to be used as a source sensor. The source sensor is a sensor used to generate the surface wave. For example, the source sensor outputs a micro-amp current to the finger to generate the surface wave. The excitation circuit 120 drives the source pixels. Examples of superpixels are shown in FIG. 2B and described below.

Instead of randomly selecting sensors to measure a fingerprint or determine a physical attribute, the sensors may be predetermined. However, random selection may minimize the ability for a user to spoof the sensing device 100. The memory 150 may also store fingerprints and one or more physical attributes for each fingerprint or user. These stored fingerprints and physical attributes may be compared to a measured fingerprint and physical attribute for a user to determine whether the user is authorized.

Instead of using source sensors, a conductor, such as the conductor 113 shown in FIG. 2, may be used to generate the surface wave. The conductor 113 may be isolated from the sensors 110 but is operable to generate a surface wave traveling between the object 101 and the sensors 110 if a ground bias plane is provided. The conductor 113 may be a solid conductor or a set of electrodes.

In addition to or instead of generating and measuring a surface wave, IR sensors may be used to determine a physical attribute of the object 101. For example, some of the sensors 110 are IR sensors measuring the IR transparency of the object 101 to determine the physical attribute. For example, determining the IR transparency comprises measuring an IR signal reflected from a surface of the object 101. Certain parts of the IR spectrum are not characteristic of gel or plastic, or a dead tissue. For example, the IR spectrum of the reflected signal is compared to an IR value for living skin tissue. IR spectrum values for different materials may be stored in a lookup table.

3. Interface and Spacing of Electrodes

Figure 3:
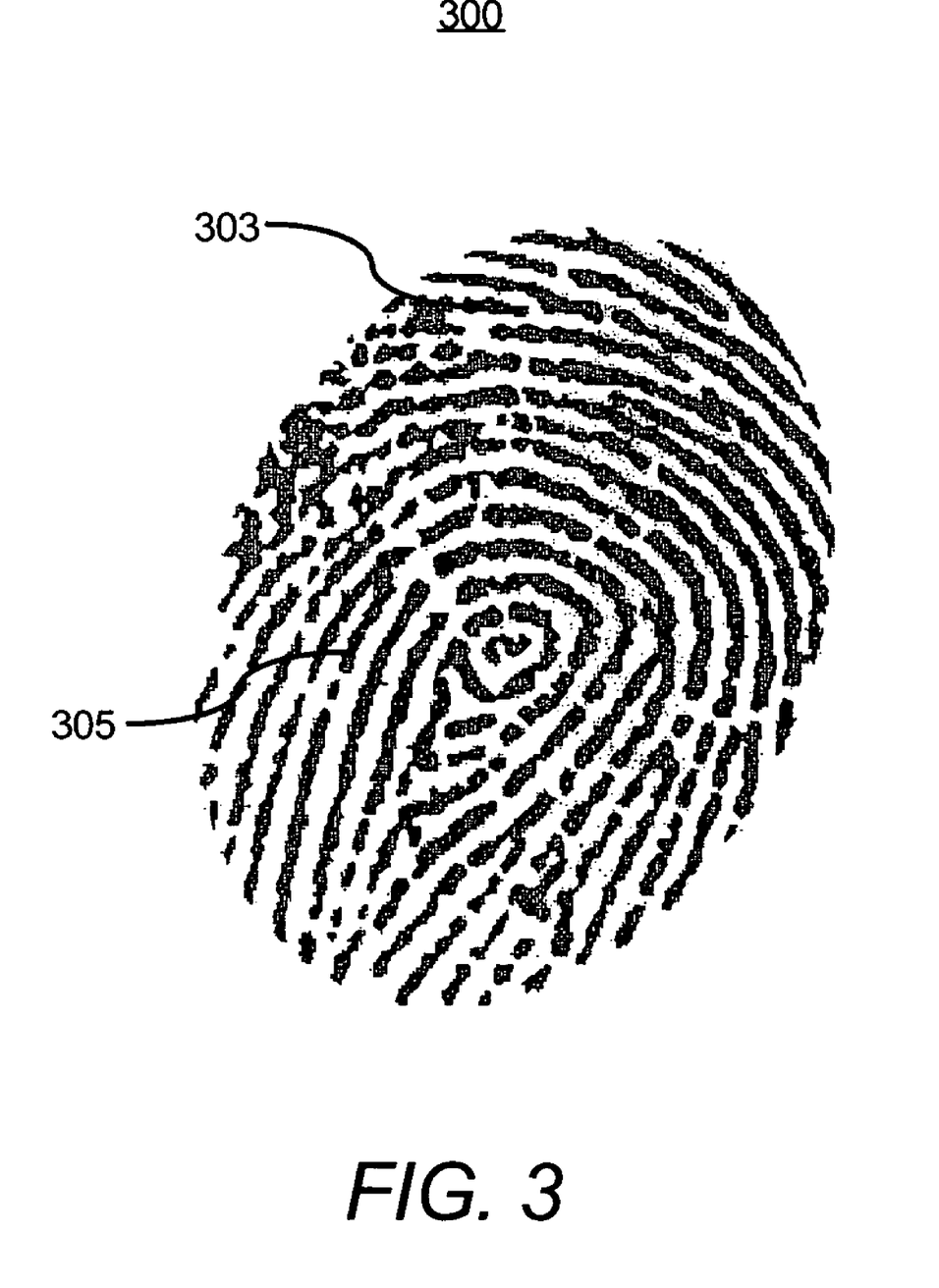
FIG. 3 illustrates a-representative fingerprint.

FIG. 2A illustrates a top view of the sensing device 100, and shows an embodiment of the interface 115 for the sensing device 100. For example, objects may be placed on the interface 115 to determine a fingerprint and a physical attribute for each of the objects. The interface 115 shown includes a top view of the sensors 110. The spacing of the sensors 110 in the array and the shape of the sensors 110 are key attributes in the ability to resolve fine features of a landscape of a fingerprint. The sensors 110, for example, include round electrodes 301, as shown in FIG. 2. However, the electrodes 301 may be different shapes, such as elliptical. Also, the spacing of the sensors 110 may be varied depending on the required sensitivity of the measurements. As an example, FIG. 2 illustrates different spacing between columns of sensors 110. If sensors are arranged closer, which may be determined by distances between the centers of the electrodes 301, these sensors are able to generate measurements having a greater fidelity. For example, referring to the representative finger print 300 shown in FIG. 3, section 303 of the fingerprint 300 is approximately the location of where the arch, loop or whorl of the fingerprint may be located, as apposed to the section 305. Sensors of the sensors 110 shown in FIG. 2 may be placed closer together in a location where a portion of a finger corresponding to the section 310 would normally be placed on the sensors 110 to capture the arch, loop or whorl at a higher fidelity. For example, sensors may have 1-10 microns of spacing. Sensors may be placed at a greater distance for a location corresponding to the section 320. For example, sensors may have 15-25 microns of spacing. If the sensing device 100 is being used for infants, infants may have a different, general landscape for fingerprints and higher fidelity measurements may be desired at a different section of the fingerprint. Thus, for infants, the sensing device 100 may be designed such that sensors 110 may be spaced closer at another location.

FIG. 2A illustrates the electrodes for the sensors 110 arranged in an (x,y) grid. FIG. 2B illustrates some of the electrodes for the sensors from the grid shown in FIG. 2A. The shape of the electrodes for the sensors shown in FIGS. 2B-C are provided for ease of illustrating the sensors 110 in a grid. The electrodes of the sensors 110 may be round, elliptical or other shapes that provide accurate measurements for determining a fingerprint or determining a physical attribute. Also, the spacing of the electrodes may be as shown in FIG. 2A or other spacing may be used.

FIG. 2B illustrates examples of superpixels 1 and 2 in the grid. In one embodiment, surface waves for determining a physical attribute are generated by applying a current to the object 101 through the source sensors 3 and 4 for the superpixels 1 and 2 respectively. Measuring sensors, which include the measuring sensor 5, measure the surface waves. This may include measuring the voltage or current generated in the measuring sensors as a result of a surface wave traveling through the electrodes for the sensors. A map of local measurements in the grid may be created by determining a measurement for each superpixel and stored in the memory 150 shown in FIG. 1. The measurement may be the mean or the aggregate of the measurements performed by the measuring sensors in each superpixel. Superpixels are shown as 3×3 arrays by way of example and designs including superpixels with larger or smaller arrays may be used. Also, superpixels may be spaced or next to each other in the grid.

FIG. 2C illustrates the electrodes for some of the sensors in the grid of FIG. 2A as IR sensors for sensing the IR spectrum of the object 101. The measured IR spectrum may be used to determine a physical attribute of the object 101. Some of the sensors shown in FIG. 2C are IR emitters, such as the IR emitter 10, and some of the sensors are IR receivers, such as the IR receiver 20. The IR emitters emit an IR signal, and the IR receivers measure the IR signal reflected from the object 101. A map of IR values may be generated from measured IR signals and stored in the memory 150. The different maps may be stored and compared to subsequently measured maps to determine whether a user is an authorized user.

4. Cross Section Description

Figure 4A:
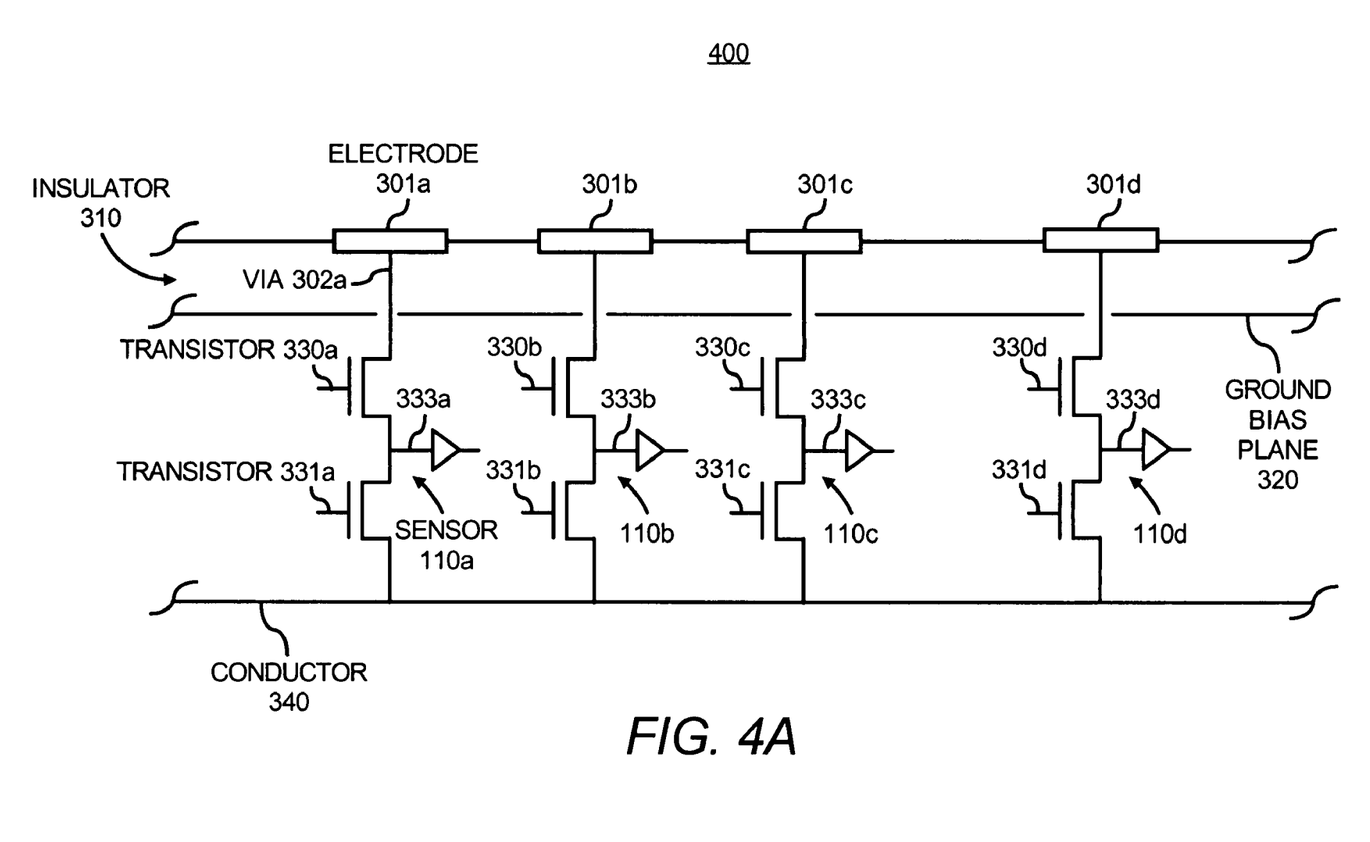
FIG. 4A illustrates a cross-section, including elements shown in a schematic, of multiple sensors, according to an embodiment.

FIG. 4A illustrates a cross section, including elements in a schematic, of multiple sensors 110*a-d* of the sensors 110 that may be used in the sensing device 100, according to an embodiment. The sensors 110*a-d* include electrodes 301*a-d*, respectively. A layer of insulator 310 may be provided below and between the electrodes 301*a-d*. The electrodes 301*a-d* may be designed such that they are flush with the insulator 310 between the electrodes 301*a-d*. The electrodes 301*a-d*, for example, are included in the interface 115 shown in FIG. 2A. For example, a surface of the object 101 shown in FIG. 1 is placed on the electrodes for the sensors 110 to determine the fingerprint of the object 101 and to determine a physical attribute of the object 101.

A ground bias plane 320 is provided between the electrodes 301*a-d* and the electronics of the sensing device 100 and may be used to bias the electromagnetic fields to shape the fringing fields. The electronics may include transistors 330*a-d* and 331*a-d*, a conductor 340, and possibly other conductors, for example, connecting the transistors 330*a-d* and 331*a-d* to the excitation circuit 120 and possibly other circuits shown in FIG. 1. The ground bias plane 320 provides a shield to prevent electromagnetic fields being impacted by co-located metal interconnects, as well as minimize capacitance between the electrodes 301*a-d* and the conductor 340 or other conductors below the electrodes 301*a-d*. For example, the electrodes 301*a-d* may be measuring capacitance between the object 101 and the electrodes 301*a-d*. Without the ground bias plane 320, a capacitance generated between the electrodes 301*a-d* and the conductor 340 would affect the capacitance between the object 101 and the electrodes 301*a-d*. Also, it may be difficult to calibrate out the capacitance between the electrodes 301*a-d* and the conductor 340 for performing high-fidelity capacitive measurements to determine the fingerprint of the object 101.

5. Description of Sensors as Reading Devices

Sensors 110*a-d* may be used as sensors for determining a fingerprint of the object 101 or as sensors for determining a physical attribute of the object 101. For example, the sensors 110*a-d* may be used to determine the fingerprint. In this example, the transistors 330*a-d* may be switched on by the excitation circuit 120, and the transistors 331*a-d* are turned off. In this state, the sensors 110*a-d* output a voltage on conductors 333*a-d* indicative of the sensed fingerprint. For example, the sensors 110*a-d* function as capacitive sensors as is known in the art, whereby the capacitance sensed by each sensor varies depending on the distance between a ridge or valley and the electrode of the sensor. The voltages output on the conductors 333*a-d* vary according to the capacitance sensed by each sensor 110*a-d*. The sensing circuit 130 shown in FIG. 1 may be connected to the conductors 333*a-d* to receive the voltages for determining the fingerprint. The sensors 110*a-d* may alternatively be resistive sensors, photo-sensors, piezoelectric sensors, or other known types of sensors that are operable to output a voltage representing the fingerprint being sensed.

6. Description of Sensors as Source Sensors

The sensors 110*a-d* may also be source sensors operable to output a current for generating surface waves. For example, the transistors 330*a-d* and the transistors 331*a-d* are switched-on to generate a current at the electrodes 301*a-d* for generating surface waves. For example, a micro-amp current is applied to the object 110 to generate a surface wave. The excitation circuit 120 may be connected to conductor 340 to supply a voltage to the sensors 110*a-d* for generating the surface wave. Other sensors of the sensors 110 may be used to measure the surface wave as it travels between the electrodes and the object 101. These sensors output a voltage indicative of the sensed surface wave to the sensing circuit 130.

7. Surface Wave Description of Sensors as Reading Devices

Figure 4B:
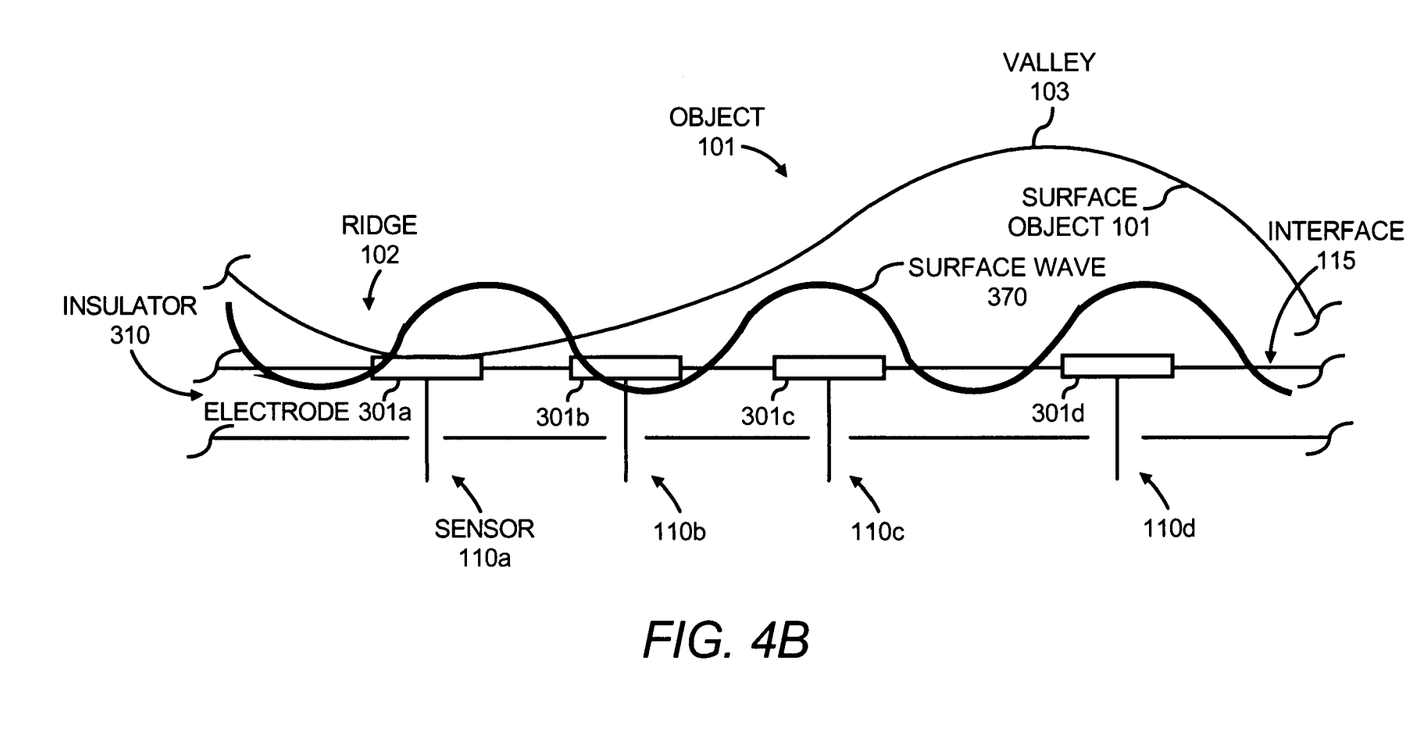
FIG. 4B illustrates a surface wave traveling between an object and sensors, according to an embodiment.

FIG. 4B illustrates a surface wave 370 traveling between the object 101 and the sensors 110. The surface wave 370 may be generated by source sensors or an isolated conductor, such as the conductor 113, shown in FIG. 2. The surface wave 370, for example, is a sine wave. The surface wave 370 is sensed by one or more sensors. For example, the sensors 110*a-d* are sensing the surface wave 370. The surface wave 370 is an example of the wave described above. The shift and shrinking of the passband of the wavelets for the surface wave 370 is detected by the some of the sensors 110 to determine a physical attribute of the object detected by the sensors 110 shown in FIG. 1.

FIGS. 4A and 4B only show the upper portion of a cross-section of some of the sensors 110 to illustrate different embodiments. It will be apparent that electronics, such as the transistors and conductors shown in FIG. 4A, are also included in these embodiments.

In one embodiment, at least two types of measurements may be performed to determine a physical attribute of the object 101. One type of measurement may include measuring a surface wave. Another type of measurement may include using the IR sensors. For example, the IR sensors may include IR sensors for emitting IR signals and IR sensors for measuring reflected IR signals for determining IR spectrum values for the object 101. The measured IR values may be compared to the IR values for living skin tissue, which is approximately 10 um, which is difficult to counterfeit. Use of multiple types of measurements also makes it difficult to spoof the sensing device 100 with non-living skin tissue, such as with plastic fingers or a gel having ridges and valleys corresponding to an authorized fingerprint.

In addition to generating surface waves, source sensors may be used for resistance measurements to determine a fingerprint. For determining resistance of the object 101, one sensor may be a source sensor and another sensor may be a sensor for outputting a voltage indicative of the sensed resistance. For example, referring to FIG. 4A, the sensor 110*a* is used as a source sensor that generates a micro-amp current which is received by the object 101. The sensor 110*b* detects a voltage caused by the resistance of a ridge or valley of the object 101. The output of the sensor 110*b* is received by the sensing circuit 130. Several source and detecting sensors are used to determine the fingerprint of the object 101.

At least two types of measurements may be performed for determining the fingerprint of the object 101. For example, when the object 101 is placed on the sensing device 100, some of the sensors are used to perform capacitive measurements and some may be used to perform resistive measurements. The output of the sensors detecting the capacitance and resistance may be compared by the controller 140 shown in FIG. 1 to values stored in the memory 150 to determine whether the capacitances and resistances are representative of a ridge or valley. Thus, the measurements may be used to determine the fingerprint. A similar comparison may be performed for photo-sensors, such as CCDs, or piezoelectric sensors.

Figure 4C:
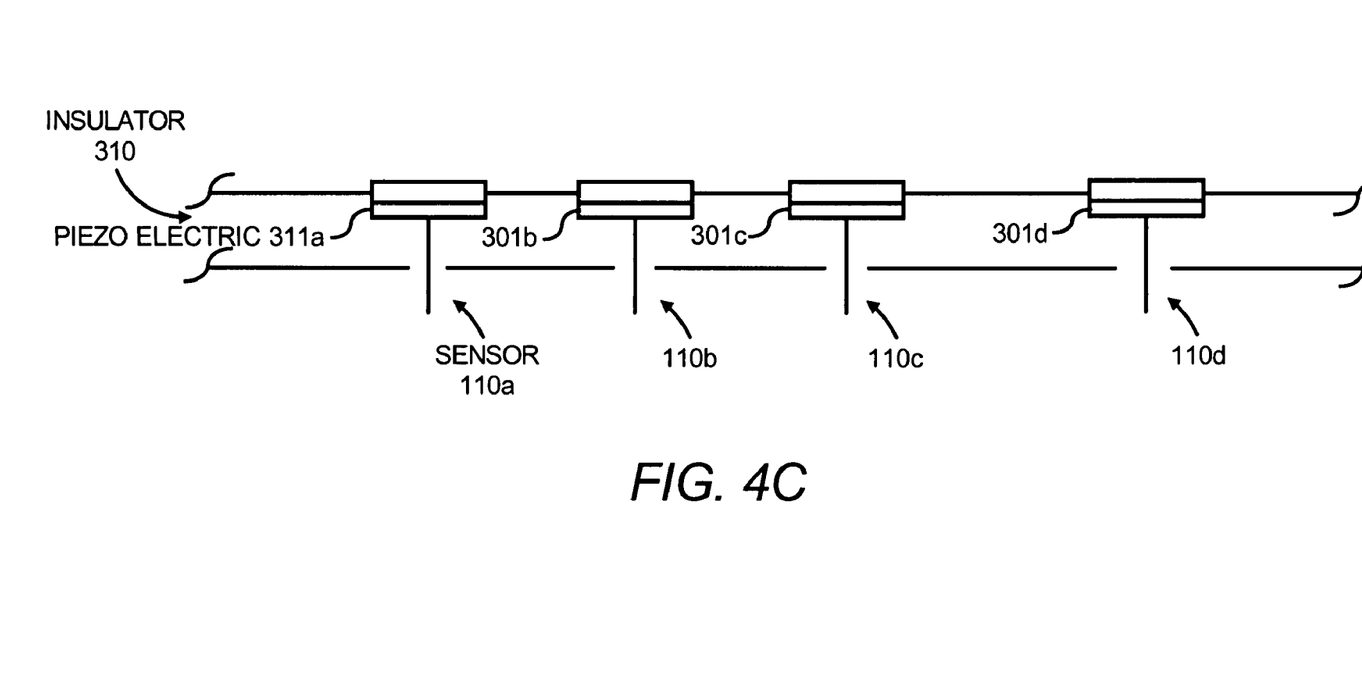
FIG. 4C illustrates a cross-section of multiple sensors including a piezoelectric layer, according to an embodiment.

FIG. 4C illustrates an embodiment of the sensors 110 that include piezoelectric sensors 110. A piezoelectric layer including piezoelectric material 311*a-d* is provided beneath the electrodes 301*a-d*. In response to thermal heat from the object 101 or mechanical stress from the object 101, the piezoelectric material 311*a-d* generates a voltage output by the sensors 110*a-d*, which is used to determine the fingerprint.

8. Fringing Fields and Grounding Sensors to Create Co-Planar Waveguide

One or more of the sensors 110 may be biased to create a co-planar waveguide for minimizing the affect of fringing fields. For example, referring to FIG. 4A, the electrodes 311*a-c* may have 1-5 micron spacing. If these sensors are used to sense capacitance or a surface wave, the fringing fields generated by the electrodes may affect the measurements. To minimize this affect, one or more of the sensors may be grounded. For example, the sensor 110b is connected to the conductor 340 by turning on transistors 330b and 331b. The conductor 340 is grounded. The sensor 110b may be in a row of sensors, such as the row 112 in the array of sensors shown in FIG. 2. The entire row of sensors may be grounded. Also, another row of sensors 114 may be grounded. Thus, if a surface wave is generated, for example, by the conductor 113 shown in FIG. 2, the rows 112 and 114 operate as boundaries for a coplanar waveguide and minimize fringing fields on adjacent rows. This may also help minimize fringing fields for capacitive measurements.

The spacing of the electrodes 301a-d shown in FIG. 4A should be noted. The sensing device 110 may be designed to have higher fidelity measurements in certain locations of the interface 115 for the object 101. For example, electrodes 401a-c may be spaced between 1-10 microns or the electrode 301d may have a larger spacing, such as 15-25 microns.

Figure 5:
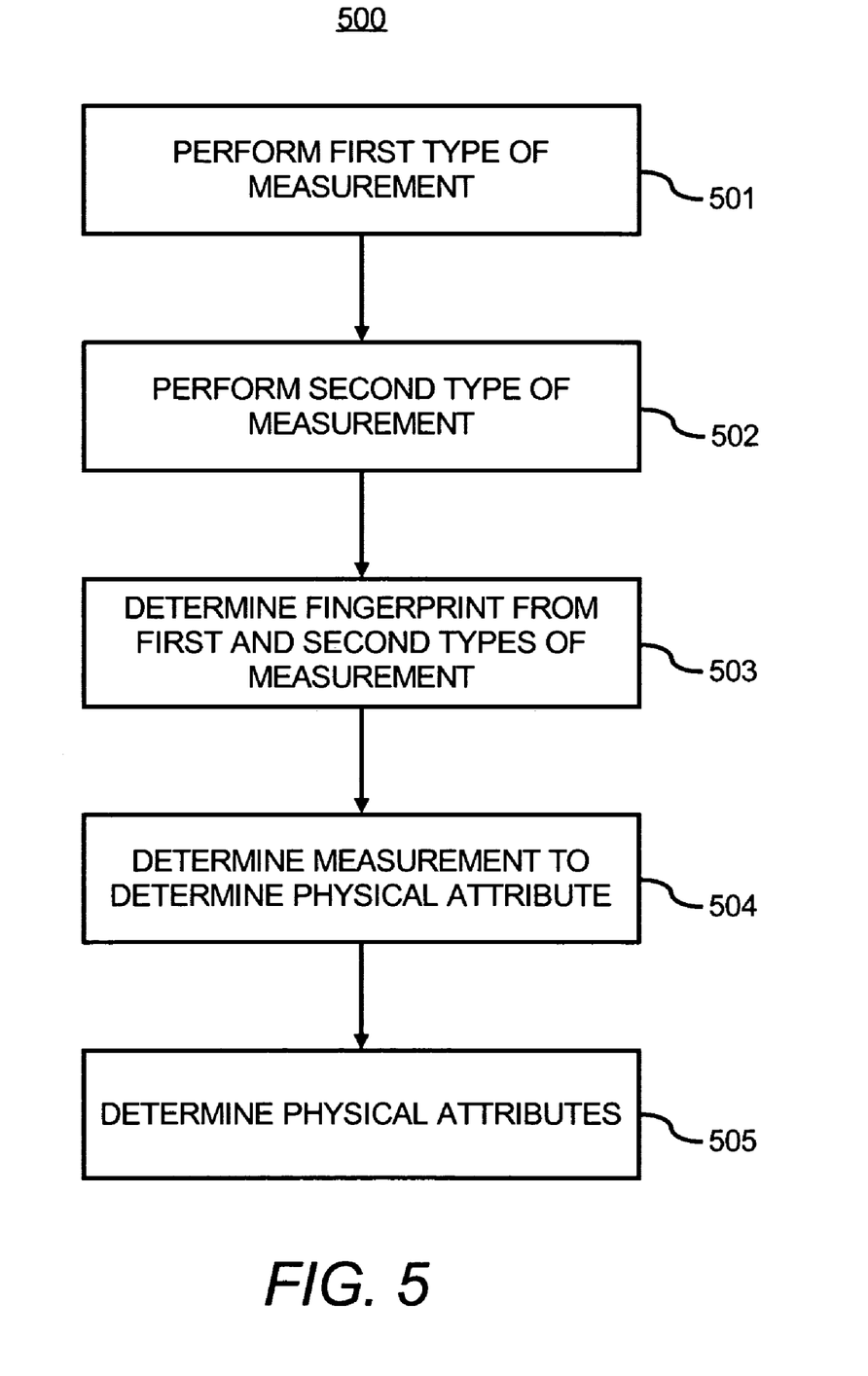
FIG. 5 illustrates a method, according to an embodiment.

FIG. 5 illustrates a method 500 according to an embodiment. The method 500 is described with respect to FIGS. 1-4A-C by way of example and not limitation. At step 501, the sensing device 100 shown in FIG. 1 performs a first type of measurement on the object 101 to determine a fingerprint of the object 101. At step 502, the sensing device 100 performs a second type of measurement on the object 101 to determine a fingerprint. Examples of the first and second types of measurements include but are not limited to capacitive, resistive, photo-sensor, and piezoelectric-sensor measurements. In one embodiment, the controller 140 shown in FIG. 1 uses lookup tables stored in the memory 150 to determine whether measurements correspond to a ridge or a valley of a fingerprint to determine the fingerprint of the object 101.

At step 503, the controller 140 shown in FIG. 1 determines a fingerprint of the object 101 from the first type of measurements and the second type of measurements. For example, a map of a first type of local measurements and a map of a second type of local measurements is determined and the maps are stored in the memory 150. The maps may be comprised of wavelets for each of the first type of measurements and second type of measurements.

At step 504, the sensing device 100 performs at least one type of measurement to determine a physical attribute of the sensor, and at step 505, the controller 140 determines a physical attribute of the object 101 based on the performed measurement. The sensing device 100 may use surface wave detection or IR sensors to determine a physical attribute of the object 101. In one embodiment, the controller 140 shown in FIG. 1 uses lookup tables stored in the memory 150 to determine whether surface wave measurements or a measured IR transparency of the object 101 corresponds to signatures for certain materials stored in the memory 150. A signature, for example, includes a value or set of values that are attributes of a material. A signature for living skin tissue may include one or more of an IR transparency for the living skin tissue and surface wave drift measurements for living skin tissue. Signatures for other materials may also be stored in the memory 150. Also, maps may be created from measurements of surface waves and IR signals. The maps may include wavelets of the measurements. Values from the maps may be compared with predetermined values to determine a physical attribute of the object 101.

By determining the physical attributes of the object 101, the sensing device 101 may determine whether an unauthorized user is attempting to spoof the sensing device 100. In one embodiment, multiple types of measurements may be performed to determine the physical attribute of the object 101, which may include both IR transparency measurements and surface wave measurements.

One or more of the steps of the method 500 and other steps described herein are operable to be implemented as software stored on a computer readable medium, such as the memory 150 shown in FIG. 1 or other memory, and executed by processing circuitry, such as the controller 140 shown in FIG. 1.

The steps are operable to be embodied by a computer program, which can exist in a variety of forms both active and inactive. For example, they exist as software program(s) comprised of program instructions in source code, object code, executable code or other formats for performing some of the steps. Any of the above can be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A fingerprint detection device comprising:
    a plurality of sensors, wherein at least some of the plurality of sensors are operable to perform a first type of measurement to determine a fingerprint of an object,
        wherein at least some of the plurality of sensors are operable to perform a second type of measurement to determine the fingerprint,
        wherein at least some of the plurality of sensors are operable to perform a third type of measurement to determine a physical attribute of the object; and
    a controller operable to determine the fingerprint from the first type of measurements and the second type of measurements,
        wherein the controller is further operable to determine the physical attribute of the object from the third type of measurements.

2. The fingerprint detection device of claim 1, further comprising:
    a memory storing fingerprints, wherein the controller is operable to compare a determined fingerprint to a stored fingerprints to determine whether the fingerprint matches a stored fingerprint.

3. The fingerprint detection device of claim 2, wherein the memory stores a signature of at least one physical attribute, and the controller is operable to determine a signature of the physical attribute of the object from the third type of measurements and compare the determined signature to the at least one stored signature to determine the physical attribute of the object.

4. The fingerprint detection device of claim 3, wherein the controller determines whether the physical attribute of the object is a biological attribute of living skin tissue.

5. The fingerprint detection device of claim 3, wherein the third type of measurements comprise measurements of at least one surface wave traveling between the plurality of sensors and the object.

6. The fingerprint detection device of claim 3, wherein the third type of measurements comprise at least one infrared signal measurement of the object.

7. The fingerprint detection device of claim 5, wherein the controller is operable to determine a drift of the at least one surface wave, and the signature of the physical attribute of the object is determined from the drift of the at least one surface wave.

8. The fingerprint detection device of claim 5, wherein the at least one surface wave is generated from a conductor isolated from the plurality of sensors.

9. The fingerprint detection device of claim 5, wherein the controller is operable to randomly select the at least one of the plurality of sensors for generating the at least one surface wave.

10. The fingerprint device of claim 1, wherein the first type of measurement and the second type of measurement comprise two of capacitive, resistive, photo, and piezoelectric-type measurements.

11. The fingerprint device of claim 1, wherein the fingerprint comprises at least two maps of measurements performed by sensors in an array of sensors, wherein one map comprises the first type of measurements and a second map comprises the second type of measurements.

12. The fingerprint device of claim 11, wherein the maps comprise wavelets constructed from the first and second type of measurements.

13. The fingerprint device of claim 1, wherein the physical attribute is determined from a map of the third type of measurements measured by sensors in an array.

14. The fingerprint device of claim 13, wherein the map comprises wavelets determined from the third type of measurements.

15. The fingerprint device of claim 1, wherein at least some of the sensors are grounded to reduce an effect of fringing fields on at least one the first type of measurement and the second type of measurement.

16. A fingerprint sensing device comprising:
an array of sensors, wherein each sensor comprises an electrode operable to detect a fingerprint and the array of sensors comprise two or more of capacitive sensors, resistive sensors, and photo sensors;
a ground plane;
an insulating layer between the electrodes and the ground plane; and
a connection for each electrode passing through the insulating layer and the ground plane and connecting the electrode to a conductor below the ground plane.

17. The device of claim 16, further comprising:
a piezoelectric layer detecting the fingerprint, the piezoelectric layer formed beneath the electrodes.

18. The device of claim 16, wherein at least some of the array of sensors comprise surface wave sensors operable to measure a surface wave traveling between the object and the electrodes for determining whether the object comprises living skin tissue.

19. The device of claim 16, wherein at least one of the sensors is operable to measure at least one IR signal of the object for determining a physical attribute of the object.

20. An apparatus comprising:
fingerprint sensor means for performing at least two types of measurements for sensing a fingerprint of an object;
physical attribute sensor means for sensing a physical attribute of the object;
controller means for determining the fingerprint and the physical attribute of the object based on output of the fingerprint sensor means and the physical attribute sensor means; and
memory means for storing at least three maps for the object, wherein one map comprises the first type of measurements measured by a group of individual sensors in the fingerprint sensor means, a second map comprising the second type of measurements measured by a group of individual sensors in the fingerprint sensor means, and a third map comprising the third type of measurements measured by a group of individual sensors in the physical attribute sensor means.

21. The apparatus of claim 20, wherein the maps comprise wavelets.

22. A method comprising:
at least one sensor performing a first type of measurements on an object to determine a fingerprint of the object;
performing a second type of measurements on the object to determine the fingerprint; and
performing a third type of measurements to determine a physical attribute of the object.

23. The method of claim 22, further comprising:
determining whether the physical attribute is a biological attribute of living skin tissue.

24. The method of claim 22, further comprising:
storing three maps of measurements,
wherein each map includes measurements performed using electrodes in different locations on an interface for a sensing device, wherein a first map of the maps includes the first type of measurements, a second map of the maps includes the second type of measurements, and a third map of the maps includes the third type of measurements.

25. The method of claim 24, further comprising:
determining wavelets for the first, second, and third type of measurements, wherein the maps comprises the wavelets.

26. The method of claim 22, wherein performing a third type of measurements further comprises:
generating at least one surface wave between sensors operable to measure the fingerprint and the object;
measuring a drift of the at least one surface wave; and
comparing the drift to at least one predetermined value to determine the physical attribute.

27. The method of claim 26 wherein generating at least one surface wave further comprises:
using at least one of the sensors to generate the at least one surface wave, wherein the at least one sensor is further operable to perform at least one of the first type of measurements and the second type of measurements.

28. The method of claim 22, further comprising:
randomly selecting sensors in an interface for a sensing device to perform at least one of the first, second and third type of measurements.

29. The method of claim 22, further comprising:

using an array of sensors to perform the first type of measurements, wherein the first type of measurements comprise capacitive measurements; and connecting at least some of the array sensors to a bias ground plane to reduce an effect of fringing fields on the capacitive measurements.

* * * * *